United States Patent [19]

Baba

[11] Patent Number: 5,342,156

[45] Date of Patent: Aug. 30, 1994

[54] MACHINE TOOL HAVING PARTITION PLATES FOR PREVENTING SPLASH OF CUTTING FLUID

[75] Inventor: Haruki Baba, Iwakura, Japan

[73] Assignee: Brother Kogyo Kabushiki Kaisha, Nagoya, Japan

[21] Appl. No.: 35,058

[22] Filed: Mar. 22, 1993

[30] Foreign Application Priority Data

Apr. 23, 1992 [JP] Japan .................................. 4-104506

[51] Int. Cl.⁵ ............................................. B23Q 11/08
[52] U.S. Cl. ...................................... 409/134; 51/268; 74/608; 408/710
[58] Field of Search ........................... 408/241 G, 710; 409/134; 51/268, 271, 272, 274; 74/608

[56] References Cited

U.S. PATENT DOCUMENTS 4,863,319 9/1989 Winkler et al. .

Primary Examiner—Daniel W. Howell
Attorney, Agent, or Firm—Oliff & Berridge

[57] ABSTRACT

A first partition plate is fixed to an upper surface of a rotatable table to separate a work position from a standby position. A second partition plate is mounted to a lower end of a door, and a forked member is mounted to a lower end of the second partition plate. During rotation of the table, the upper end of the first partition plate does not contact the lower end of the forked member. During machining of a work, a cutting fluid splashing in the work position is substantially prevented from reaching the standby position.

14 Claims, 5 Drawing Sheets

MACHINE TOOL HAVING PARTITION PLATES FOR PREVENTING SPLASH OF CUTTING FLUID

BACKGROUND OF THE INVENTION

1. Field of the Invention

The invention relates to a machine tool including a table rotatable about an axis, the table having a work position for machining a workpiece and a standby position for preliminarily setting another workpiece, and a supporting member provided over the table and, more particularly, to a machine tool constructed so as to prevent cutting fluid, supplied to the workpiece in the work position during machining, from splashing toward an operator.

2. Description of the Related Art

A machine tool of this type is disclosed in U.S. Pat. No. 4,863,319, for example. In this known machine tool, a partition is fixedly mounted on an upper surface of a table and a tongue member, as a chip guard element, is mounted on a lower surface of a beam. The partition and the tongue member are overlapped with each other, thereby preventing splash of a cutting fluid during machining of the workpiece. It is unnecessary to provide an automatic door or the like to be opened or closed, so as to avoid interference with the work during rotation of the table, thus reducing costs. Furthermore, the change of workpieces can be performed at high speeds.

However, when the tongue member, the chip guard element mounted on the lower surface of the beam, is formed of an elastic plastic, the tongue member is gradually hardened by the influence of the cutting fluid to cause curling of an end portion of the tongue member. As a result, a gap is formed between the partition and the tongue member and there is a possibility that the cutting fluid will splash through the gap toward an operator.

Further, when the tongue member is formed of a rigid material, such as a thin metal sheet or an acrylic glass plate, the partition contacts the tongue member during rotation of the table generating noise and shortening the life of the tongue member.

SUMMARY OF THE INVENTION

It is accordingly an object of the invention to provide a machine tool which can surely prevent splash of the cutting fluid and maintain such a splash prevention effect for a long period of time.

According to the invention, there is provided in a machine tool having a table rotatable about an axis, the table having a work position for machining a workpiece and a standby position for preliminarily setting another workpiece, and a supporting member provided over the table; the improvement comprising a first partition plate fixedly mounted on the table in the vicinity of the axis for separating the work position from the standby position; and a second partition plate fixed to the supporting member and extending toward the first partition plate on substantially the same plane, the second partition plate having a forked member so formed as to straddle the first partition plate with a gap defined therebetween.

Preferably, the supporting member comprises a pair of openable doors and the second partition plate is fixed to a lower end of each of the doors.

In the machine tool having the above structure according to the invention, splash of the cutting fluid from the work position to the standby position is mostly prevented by the first partition plate and the second partition plate, and a part of the cutting fluid splashing toward the gap between the first partition plate and the forked member of the second partition plate is blocked by the forked member. Further, in changing the workpieces, the first partition plate is rotated together with the table without interfering with the forked member of the second partition plate.

Further, when the doors are opened or closed, the second partition plate is moved together with each door.

As described above, the splash of the cutting fluid from the work position to the standby position is prevented by the first partition plate fixedly mounted on the table and the second partition plate having the forked member located so as to straddle the first partition plate with the gap defined therebetween. Accordingly, the splash of the cutting fluid can be surely prevented. Furthermore, in changing the workpieces, the first partition plate does not contact with the forked member of the second partition plate. Accordingly, the splash prevention effect can be maintained for a long period of time.

Lastly, as the second partition plate is fixed to the lower end of each door in the preferred mode, the splash of the cutting fluid can be surely prevented and the replacement of tools or maintenance can be easily performed.

DETAILED DESCRIPTION OF THE PREFERRED EMBODIMENTS

There will now be described a preferred embodiment according to the invention with reference to the drawings.

Figure 1:
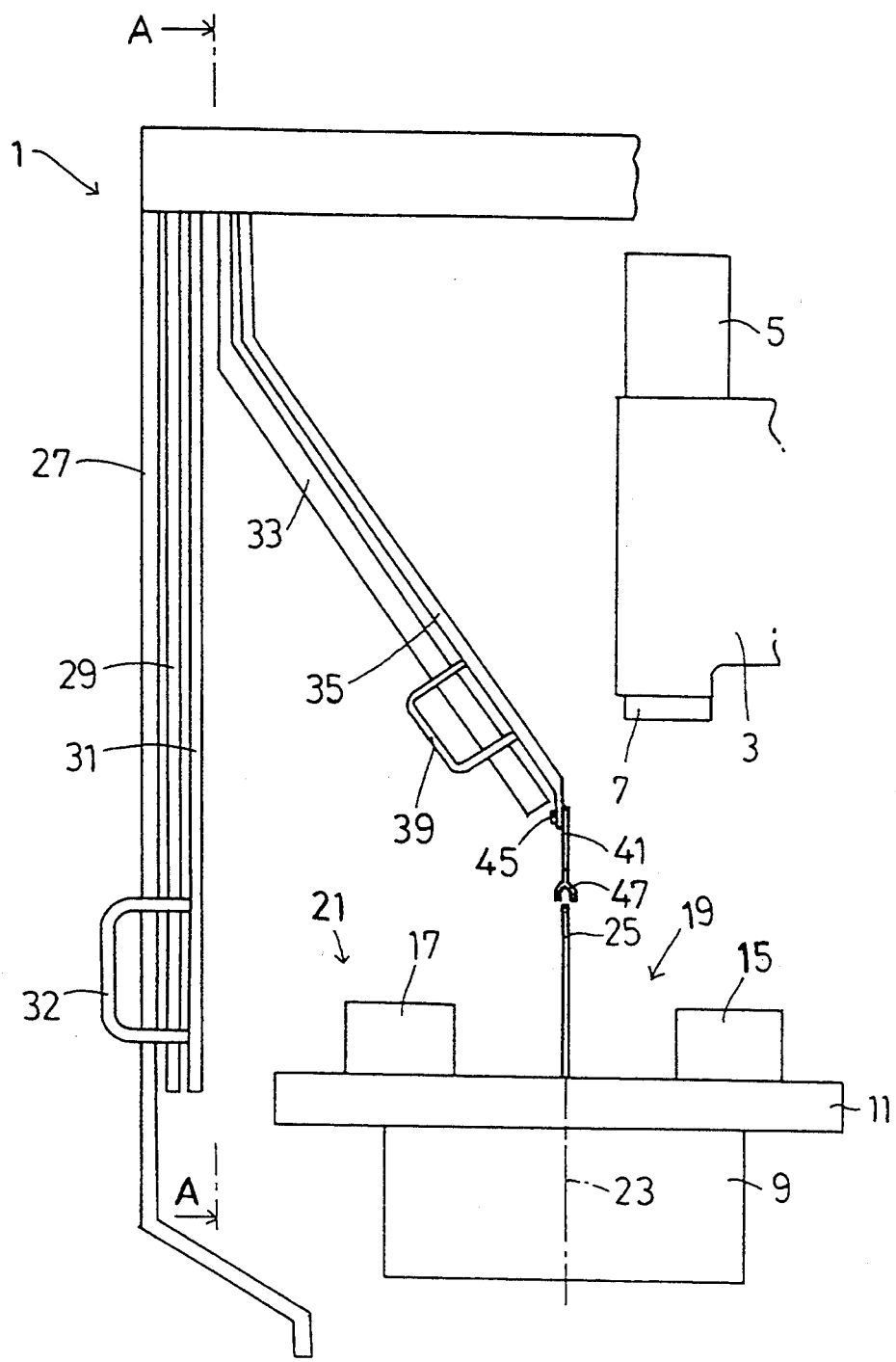
FIG. 1 is a partially cutaway side view of a machine tool in a preferred embodiment according to the present invention.
Figure 2:
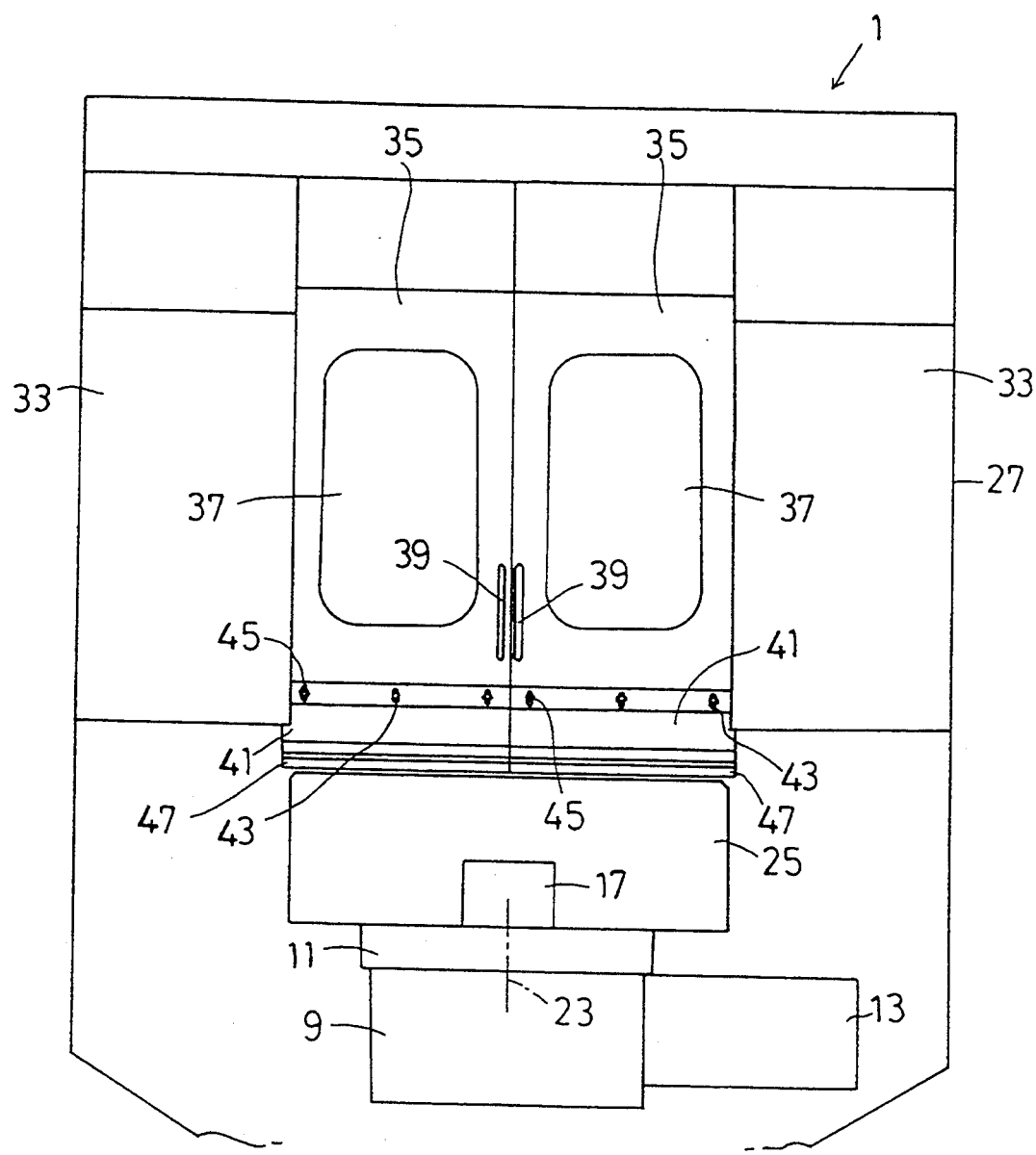
FIG. 2 is a front elevation in section taken along the line A—A in FIG. 1.

Referring to FIGS. 1 and 2, reference numeral 1 generally denotes a machine tool in the preferred embodiment. The machine tool 1 includes a spindle head 3 adapted to be vertically reciprocated. A spindle 7 is rotatably supported in the spindle head 3. The spindle 7 is adapted to be rotated by a motor 5. A table 11 is located below the spindle head 3. The table 11 is supported on a base 9. The table 11 is adapted to be rotated in 180 degree increments about a vertical axis 23 by a motor 13 fixed to the base 9 to take a work position 19 for machining a workpiece 15 and a standby position 21 for preliminarily setting a workpiece 17. A first partition plate 25, for separating the work position 19 from the standby position 21, is fixed to an upper surface of the table 11 at a position containing the vertical axis 23. The first partition plate 25 is formed of a transparent rigid material such as an acrylic plate so that a machining condition in the work position 19 may be observed.

The machine tool 1 is generally covered with a splash guard 27. Two doors 29 and 31 are slidably supported to a front portion of the splash guard 27. The two doors 29 and 31 are adapted to be opened and closed in one direction. A handle 32 for opening and closing the door 31 is mounted on a front surface of the door 31. A pair of right and left guard plates 33 laterally spaced from each other are fixed to the inside of the splash guard 27 so as to overhang the right and left sides of the standby position 21. A pair of right and left doors 35 are slidably supported to the right and left guard plates 33, respectively, so as to be laterally opened and closed between the right and left guard plates 33. A transparent glass plate 37 is mounted within each door 35 so that the machining condition in the work position 19 may be served. A handle 39 for opening and closing each door 35 is mounted on a front surface of each door 35.

Figure 3:
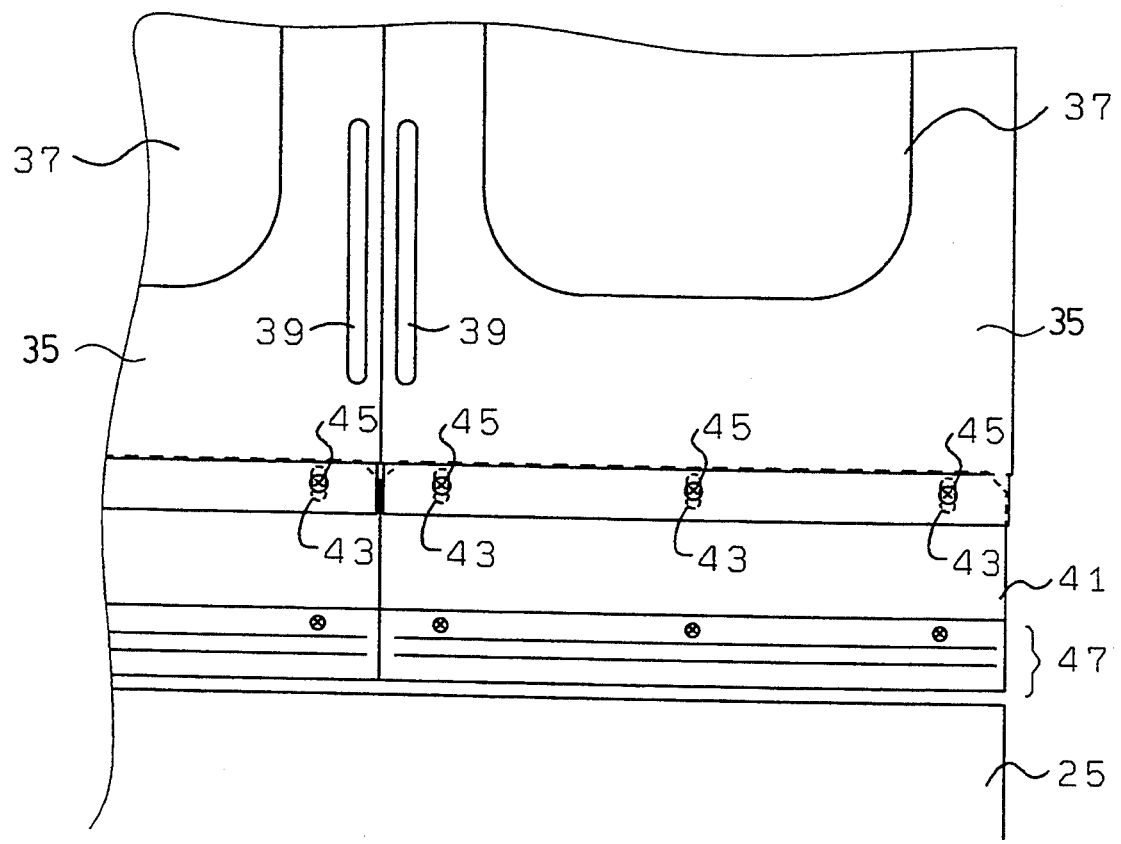
FIG. 3 is an enlarged front elevation showing a mounting condition of the second partition plates to the doors shown in FIG. 2.
Figure 4:
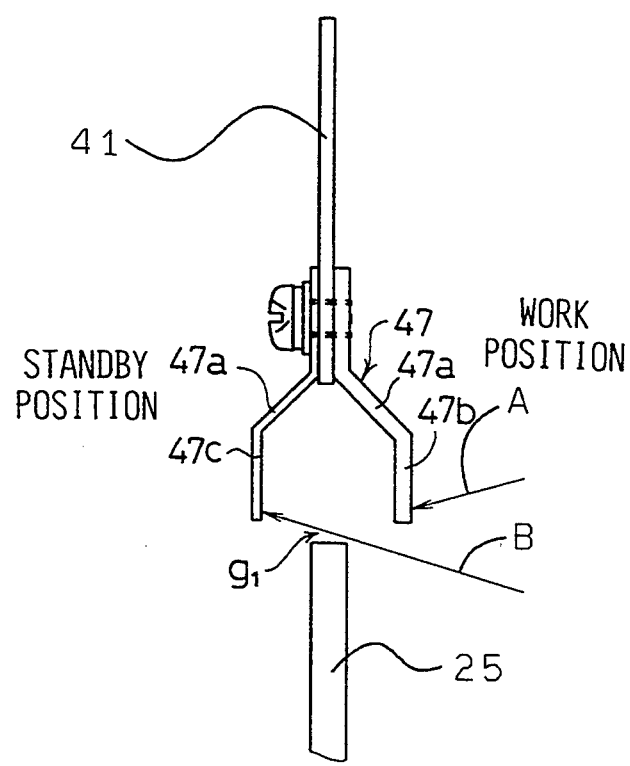
FIGS. 4A, 4B and 4C are enlarged side views illustrating a splashing condition of a cutting fluid in the preferred embodiment, the prior art and an alternative embodiment respectively.
Figure 4:
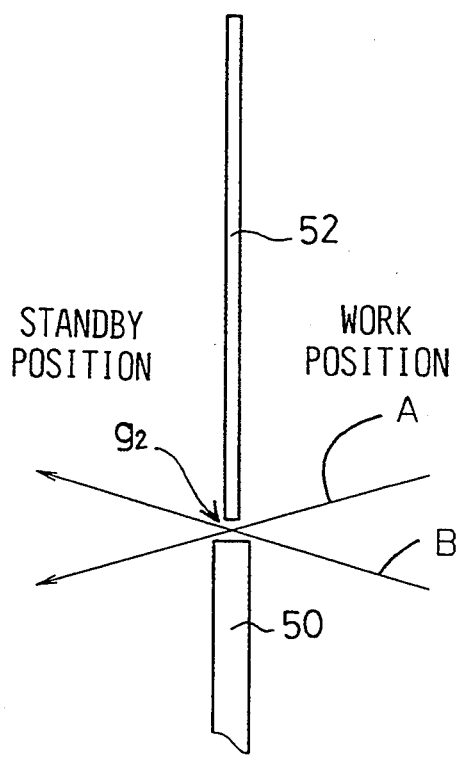

As shown in FIGS. 2 and 3, three vertically elongated holes 43 are formed through a lower end portion of each door 35. A second partition plate 41 is vertically slidably fixed at its upper end portion thereof to the lower end portion of each door 35 by securing bolts 45 through the elongated holes 43. Each second partition plate 41 extends toward the first partition plate 25 and can be adjusted in vertical position. Like the first partition plate 25, each second partition plate 41 is formed of a transparent rigid material such as an acrylic plate so that the machining condition in the work position 19 may be observed. Further, a forked member 47 is fixedly mounted at its upper end portion to a lower end portion of each second partition plate 41 by means of bolts (FIG. 4A). As best shown in FIG. 4A, the forked member 47 is so formed as to have a substantially U-shaped cross section in such a manner as to straddle the first partition plate 25. That is, the forked member 47 has tapering upper portions 47a and a pair of leg portions 47b and 47c extending substantially parallel to each other from the tapering upper portions 47a. There is defined a gap g1 between a lower end of the leg portions 47b and 47c and an upper end of the first partition plate 25. This gap g1 is set to about 2 mm, for example, as viewed horizontally. The vertical position of each second partition plate 41 having the forked member 47 is adjusted to define the gap g1 by securing the bolts 45 through the elongated holes 43. That is, an error relating to the gap g1 in mounting the second partition plate 41 to each door 35 can be adjusted by loosening and moving the bolts 45 in the elongated holes 43 and then resecuring the bolts 45 when the proper gap has been set.

In operation, the doors 29 and 31 are opened, and the workpiece 15 is fixed to the upper surface of the table 11 in the standby position 21. The doors 29 and 31 are closed and the motor 13 is driven to rotate the table 11 through 180 degrees. Accordingly, the workpiece 15 on the table 11 is displaced from the standby position 21 to the work position 19 by the 180 degree rotation of the table 11. When the workpiece 15 is properly positioned, the motor 5 is driven by a machining start command to rotate the spindle 7, and the spindle head 3 is lowered to start the machining of the workpiece 15. In the above course of operation, the pair of doors 35 are kept closed, and accordingly, the pair of second partition plates 41 fixed to the doors 35 are also kept closed.

When the machining is started, a cutting fluid is supplied under a high pressure in a plurality of different directions to the portion of the workpiece 15 being machined. The cutting fluid, having splashed off the workpiece 15 and the upper surface of the table 11, is mostly blocked by the first partition plate 25 and the second partition plates 41, so that the amount of the splashing cutting fluid that might reach the standby position 21 can be greatly suppressed.

FIGS. 4A and 4B show a splashing condition of the cutting fluid in the preferred embodiment and the prior art, respectively. As shown in FIG. 4A, the cutting fluid A splashing from an upper area in the work position 19 toward a lower area in the standby position 21 is blocked by the right leg portion 47b of each forked member 47. Further, a cutting fluid B splashing from a lower area in the work position 19 toward an upper area in the standby position 21 and passing through the gap g1, between the upper end of the first partition plate 25 and the lower end of the right leg portion 47b of each forked member 47, is blocked by the left leg portion 47c of each forked member 47. In contrast thereto, as shown in FIG. 4B, the splashing cutting fluids A and B pass a similarly sized gap g2 between a lower partition plate 50 and an upper partition plate 52, having no forked member, thus reaching the standby position in a prior art device intended to increase the life of the splash protector.

During the machining of the workpiece 15, the doors 29 and 31 are opened, and the next workpiece 17 is fixed to the upper surface of the table 11 in the standby position 21. Then, the doors 29 and 31 are closed again. When the machining of the workpiece 15 is completed, the motor 13 is driven again to rotate the table 11 by 180 degrees. Accordingly, the workpiece 15, machined on the table 11, is displaced from the work position 19 to the standby position 21 and, simultaneously, the next workpiece 17, to be machined on the table 11, is displaced from the standby position 21 to the work position 19. During this rotation of the table 11, the first partition plate 25 is rotated together with the table 11 without interfering with the lower ends of each forked member 47. The workpiece 15 is then removed from the standby position 21 by the operator and the workpiece 17 in the work position 19 starts to be machined.

While the doors 35 are kept closed during the machining of the workpiece 15 or 17, they are opened for changing tools or performing maintenance that contributes to easy operation.

In this preferred embodiment, each forked member 47 has the tapering upper portion 47a slanting downwardly. Accordingly, chips generating during the machining of the work 15 or 17 do not come to rest on the tapering upper portion 47c of each forked member 47.

Figure 4C:
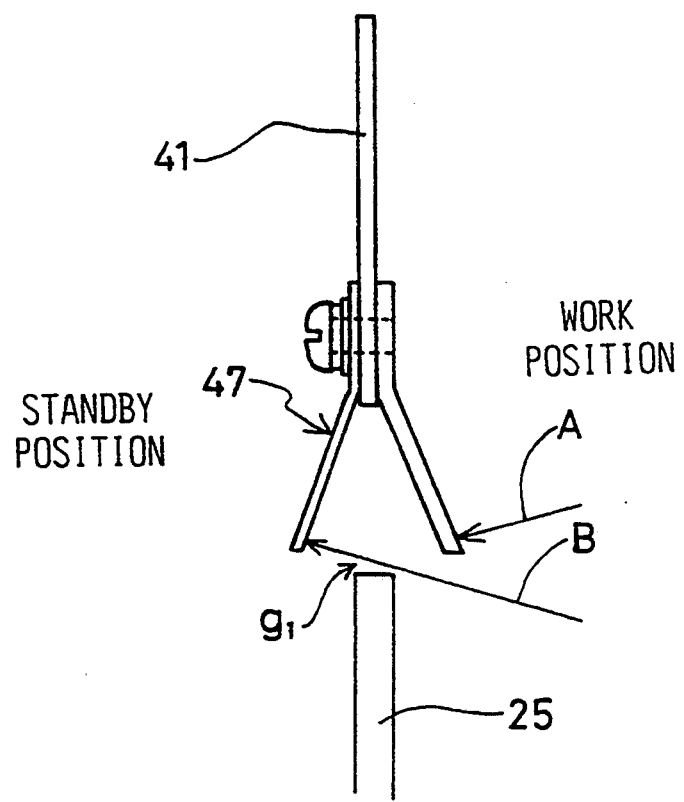

Although each forked member 47 is so formed as to have a substantially U-shaped cross section in this preferred embodiment, the shape of each forked member 47 is not limited to the above, but it is only necessary to block a cutting fluid splashing obliquely. For example, each forked member 47 may be formed to have a substantially Y-shaped, or inverted V-shaped cross section as shown in FIG. 4C.

Further, although the table 11 is adapted to be rotated about the vertical axis 23 in the above preferred embodiment, it may be adapted to be rotated about a horizontal axis in a horizontal machine tool because both the first partition plate 25 and the second partition plates 41 are formed of a rigid material.

Further, the rigidity of the second partition plates 41 may be made lower than the rigidity of the first partition plate 25, so that even if the second partition plates 41 interfere with the first partition plate 25 or the workpiece 15 or 17, the second partition plates 41 will be broken or deflected without any adverse effects upon the doors 35.

What is claimed is:

1. In a machine tool including a table rotatable about an axis, said table having a work position for machining a workpiece and a standby position for preliminarily setting another workpiece, and a supporting member provided over said table, the improvement comprising:

a first partition plate fixedly mounted on said table in the vicinity of the axis, for separating the work position from the standby position; and a second partition plate fixed to said supporting member and extending toward said first partition plate on substantially the same plane, said second partition plate having a forked member so formed as to straddle said first partition plate with a gap defined therebetween.

2. The machine tool as defined in claim 1, wherein said supporting member comprises a pair of openable doors, and said second partition plate is fixed to a lower end of each of said doors.

3. The splash guard as claimed in claim 1, wherein said forked member of said second partition has an inverted U-shaped cross section.

4. The splash guard as claimed in claim 1, wherein said forked member of second partition has an inverted V-shaped cross section.

5. A splash guard for a machine tool in which a workpiece is mounted on a rotatable table positioned opposite a working tool, the table and working tool housed within a housing, the splash guard comprising:

a first partition plate fixedly mounted to a surface of said table, a plane defined by said first partition plate passing through an axis of rotation of the table;

a support extending from the housing to a point aligned with but separated from said first partition plate;

a second partition plate mounted to an end of said support closest to said first partition plate, a lower portion of said second partition plate being forked so as to extend toward each side of said first partition plate while maintaining a gap between said first partition plate and said second partition plate.

6. The splash guard as claimed in claim 5, wherein said support comprises:

a guard plate extending from each side of said housing; and a pair of opposing sliding doors, a one of said sliding doors being seated behind each one of said guard plates when said sliding doors are in an open position.

7. The splash guard as claimed in claim 6, wherein a first part of said second partition is mounted to a first door of said pair of opposing sliding doors and a second part of said second partition is mounted to a second door of said pair of opposing sliding doors.

8. The splash guard as claimed in claim 5, wherein said lower portion of said second partition has an inverted U-shaped cross section.

9. The splash guard as claimed in claim 5, wherein said lower portion of second partition has an inverted V-shaped cross section.

10. The splash guard as claimed in claim 5, further comprising means for permitting adjustment of said gap.

11. A machine tool comprising:

a rotatable table having a first work position for machining a workpiece and a standby position for preliminarily setting a second workpiece;

a supporting member provided over said rotatable table;

a first partition plate with a first side and a second side fixedly mounted on said table for separating the work position adjacent the first side from the standby position adjacent the second side; and a second partition plate fixed to said supporting member and extending toward said first partition plate, said second partition plate having a straddled portion extending toward each of said first and second sides of said first partition plate with a gap defined between said first partition plate and said second partition plate.

12. The splash guard as claimed in claim 11, further comprising means for adjusting the gap.

13. The machine tool as claimed in claim 12, wherein said second partition plate has a plurality of elongated holes and said second partition plate is fixed to said supporting member by bolts passing through said plurality of elongated holes, wherein a combination of said bolts and said plurality of elongated holes provide said means for adjusting the gap.

14. The machine tool as defined in claim 11, wherein said supporting member comprises a pair of openable doors, and said second partition plate is fixed to a lower end of each of said doors.

* * * * *